April 25, 1961 M. FARBER 2,981,792

COLOR CORRECTION COMPUTER FOR ENGRAVING MACHINES

Filed Oct. 31, 1957 7 Sheets-Sheet 1

(1) $M = a_M + b_M RF + c_M GF + d_M BF - M'_{MYC}(1-S_K) - M'_{MY}(S_K - S_R) - M'_{MC}(S_K - S_V) + (1 - M'_{YC})(S_K - S_G)$ (2) $Y = a_Y + b_Y RF + c_Y GF + d_Y BF - Y'_{MYC}(1-S_K) - Y'_{MY}(S_K - S_R) - Y'_{YC}(S_K - S_G) + (1 - Y'_{MC})(S_K - S_V)$ (3) $C = a_C + b_C RF + c_C GF + d_C BF - C'_{MYC}(1-S_K) - C'_{YC}(S_K - S_G) - C'_{MC}(S_K - S_V) + (1 - C'_{MY})(S_K - S_R)$

MONROE FARBER,
INVENTOR

BY Homer R. Montague
ATTORNEY

COLOR CORRECTION COMPUTER FOR ENGRAVING MACHINES

Filed Oct. 31, 1957 7 Sheets-Sheet 2

MONROE FARBER
INVENTOR

BY Homer R. Montague
ATTORNEY

April 25, 1961 M. FARBER 2,981,792

COLOR CORRECTION COMPUTER FOR ENGRAVING MACHINES

Filed Oct. 31, 1957 7 Sheets-Sheet 3

MONROE FARBER,
INVENTOR

BY Homer R. Montague
ATTORNEY

April 25, 1961 M. FARBER 2,981,792

COLOR CORRECTION COMPUTER FOR ENGRAVING MACHINES

Filed Oct. 31, 1957 7 Sheets-Sheet 4

INVENTOR:
MONROE FARBER

BY Homer R. Montague

ATTORNEY

COLOR CORRECTION COMPUTER FOR ENGRAVING MACHINES

Filed Oct. 31, 1957 7 Sheets-Sheet 5

MONROE FARBER,
INVENTOR

BY Homer R. Montague
ATTORNEY

April 25, 1961 M. FARBER 2,981,792

COLOR CORRECTION COMPUTER FOR ENGRAVING MACHINES

Filed Oct. 31, 1957 7 Sheets-Sheet 6

MONROE FARBER,
INVENTOR

BY Homer R. Montague
ATTORNEY

MONROE FARBER
INVENTOR

BY Homer R. Montague
ATTORNEY

United States Patent Office 2,981,792
Patented Apr. 25, 1961

2,981,792

COLOR CORRECTION COMPUTER FOR ENGRAVING MACHINES

Monroe Farber, Jericho, N.Y., assignor to Fairchild Camera and Instrument Corporation, a corporation of Delaware Filed Oct. 31, 1957, Ser. No. 693,577

14 Claims. (Cl. 178—5.2)

This invention pertains to electronic computing apparatus, and in particular to electronic computing equipment intended to modify the electrical signals derived from a photoelectric copy scanning head in such a way that the modified signals, when applied to an engraving type of reproducing machine, will produce a color corrected separation in the form of a direct printing plate or equivalent stereotype. A set of such color-corrected printing plates, one for each primary color and usually a separate black printer, can then be used for the direct printing of a half-tone reproduction of the original copy in the usual manner of multi-color printing.

A variety of factors complicate the ideal solution of the problem of producing color corrected separations, some of which are pertinent both to the production of direct reproductions, as by photographic methods, and to the more complex production of reproductions through the intermediary of printing plates, as in the present invention. In addition to such common factors, however, the special problem of producing color corrected printing separations involves additional complications related to the departure of available and economical printing inks from ideal color characteristics, the characteristics of the paper and printing process to be used, including the effects of overlap amongst dots making up the structure of the half-tone print, and others. Even in the case of color correction for the making of photographic prints or transparencies for direct view, the mathematically correct solution of the correction equations would require extreme complexity in the computing apparatus. For these and other reasons, the making of color reproductions of any kind for commercial purposes has always required a considerable amount of effort and judgment on the part of highly skilled operators, and the successful use of modern computational aids has in general not been realized.

It is accordingly a principal aim of the present invention to devise a computer especially adapted for the practical solution of the problems of color correction involved in the making of color printing half-tone plates by automatic plate engraving machinery originally devised for the making of black and white, or monochrome, printing plates. To avoid encumbering the present disclosure with information already familiar to those skilled in the art, reference is made to a preferred commercial type of such engraving equipment exemplified by the patent to Boyajean, Reissue 23,914, dated December 21, 1954. Such apparatus provides for the helical scanning of a piece of original copy by a photoelectric scanning head whose output signal then controls the engraving penetration of a stylus into a printing plate driven synchronously with the original copy, and produces a half-tone plate for direct monochrome printing or for reproduction by matting or the like processes.

In theory, at least, a set of suitable color separation printing plates could be reproduced by scanning the original copy several times with the machine of the Boyajean patent, and each time restricting the light entering the pick-up head to a different spectral region, to produce a set of separate printing plates which, when printed with the respective inks of appropriate colors and in proper registry, would produce an adequate color reproduction of the original. However, experience has taught, and theory predicted, that such an effort produces only inferior color reproductions, and even then only with certain types of original copy. Whether this is due to the fact that available filters do not meet the requirements for sharpness of spectral cutoff and uniform transmission, or to the characteristics of the printing inks, or both, is academic. Moreover, as has been shown by H. E. J. Neugebauer and others (see, for example, Zeitschrift fur Technische Physik, vol. 36, page 22 to 89, 1937), the color of a reproduction produced by three color half-tone printing is a mixture of eight actual colors, and the equations relating the tristimulus coordinates of the produced color to the fractional dot areas printed with the process inks are a set of three involved equations which would in practice have to be solved simultaneously (in the algebraic sense) for each point of the original copy. While efforts have been made to realize a perfect color correcting system by computers designed to effectuate the latter kind of solution, the results in terms of realism or acceptability of the finished reproductions have not justified the vast expenditure of technical means required for such a solution.

It is accordingly a further object of the present invention to provide a color correction computing system or appartus in which all useful information furnished by theoretical studies of the problem is employed, but in which the practical realization of high quality printed reproductions is also aided by the acceptance of certain approximations which have been found permissible insofar as reproduction quality and realism are concerned, and which effect valuable simplifications in the equipment required and hence in the cost of obtaining the desired printing plates and reproductions.

Another object of the invention is to provide a color correction system of the above kind in which relatively simple and familiar components are employed to permit the desired computations to be carried out almost wholly without human effort, yet providing opportunity for the user to exercise his own judgment and experience in achieving a particular deviation of the finished product from that which would be rigorously dictated by a wholly automatized solution of the mathematics of the situation.

Still another object of the invention is to provide a color correction computer having a minimum of operational controls rationally arranged to permit successful operation of the equipment even by relatively unskilled personnel; these controls are to include, besides the ones related to the selection of the particular color (of a set) to be reproduced by a particular engraving or separation, additional ones directed to the compensation of the computational results for such variables as the nature of the inks to be used in the final printing process, the speed or other parameters of the printing process, such as those related to the non-drying of inks between successive impressions, the percentage of overlap amongst colors laid down by the respective separations, and the like.

Yet another object of the invention is to provide a color signal correction apparatus utilizing a novel form of matrixing to provide rapid and usable solutions in sufficiently approximate form, for a set of simultaneous equations embodying inter-dependent coefficients, and in which the parameters which should be under the user's control can readily be varied in accordance with his experience or as dictated by the form in which the produced reproductions will be employed in the printing process.

An ancillary object of the invention is to provide a computer and apparatus of the kind indicated above, such that once the contrast corrections and matrixing coefficients have been adjusted to agree with the dictates of the printing process, no further adjustments other than for the white levels of the primary signals need be made for handling all other originals of the same general type.

A further object of the invention is to provide a color computer of the kind indicated, especially adapted for using primary (scanner) color signals of a single polarity, and utilizing direct coupled amplifiers of simple forms in such a way that the usual limitations and objections to such amplifiers are overcome.

Another object is to provide a color computing system in which the hue and saturation information contained in the scanner signals is retained without loss during the variation of brightness, contrast or gamma as required to produce corrected reproductions.

In general, the invention adjusts the color range or gamut of the original subject matter to fit the available color range or gamut of the intended printing process, with maximum retention of the color signal information commensurate with the practical realization of commercial and realistic reproductions.

The above and other objects of the invention and its novel and characteristic features will best be understood by referring now to the following detailed specification of a preferred embodiment thereof and certain modifications, and illustrated in the accompanying drawings, in which.

*General introduction*

Figures 1, 2, 3:
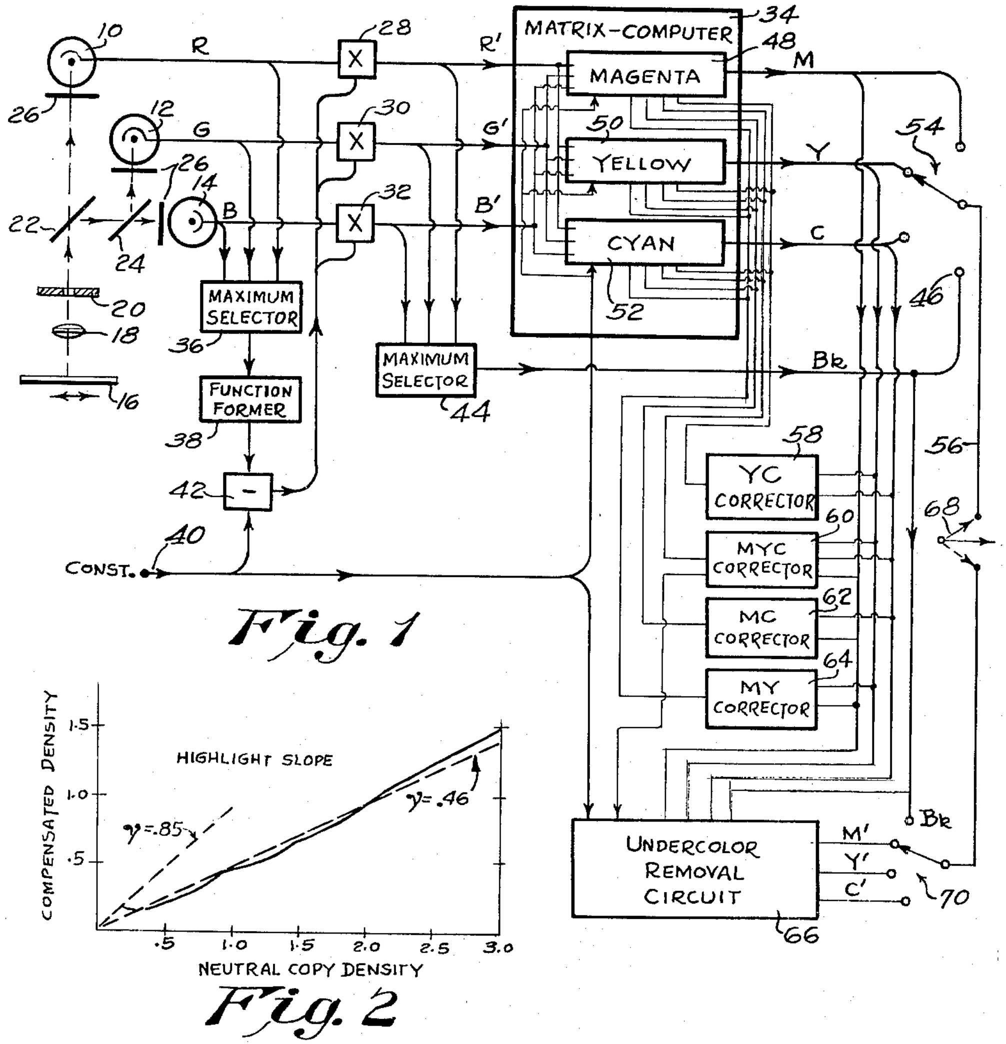
Fig. 1 is a schematic functional diagram of a complete color correction system for electrical color signals in accordance with the invention.
Fig. 2 is a graphical representation of a typical control for the reduction in overall gamma provided to maintain color hue and saturation in the reproduction of color tones of different brightnesses.
Fig. 3 is a tabulation of the Neugebauer equations in an inverted or inside-out form especially adapted for computational purposes, and facilitating the making of permissible approximations in their solution.

In order to encompass a description of the invention without unnecessary length, yet so that those reasonably skilled in the art can practice the same, certain simplifying steps have been taken. Thus, reasonable familiarity with conventional photoelectric engraving machines and techniques, such as those contained in the Boyajean patent, are assumed, as well as familiarity with the general art of color printing half-tone processes and nomenclature. In the drawings, as well as in the description, it has been deemed sufficient to illustrate known components by a labelled block, but of course where such a block is used to represent significant inventive detail in a functional diagram (such as Fig. 1), its contents will be shown in more detail in a subsequent figure or description. Also, where several wholly analogous components are required, as in different signal channels, only a typical one is described in detail, such being adequate for a clear understanding by the skilled worker.

The principal system adopted for disclosure is one which has proved highly satisfactory in actual tests, and employs single-sided (monopolar) pulse signals rather than balanced, two-sided or bipole signals. However, many features of the invention are applicable to signals of either kind, and no unnecessary limitation is to be deemed implied by this illustrative convenience. As will be understood, the pulse nature of the photocell or photomultiplier signals results from the pulse or on-off modulation provided by normal monochrome engravers in achieving the desired regular pattern of half-tone dots, as described in the Boyajean and other patents. The signals are therefore in the form of regular successions of pulses, varying in amplitude in accordance with the chromatic reflectivities or transmissivities of the points of the original copy, but with a fixed repetition frequency determined by the desired "screen" or coarseness of the half-tone pattern.

Since the invention to be claimed deals principally with the computational aspects of the apparatus, the illustration or description of particular engraving machine details or characteristics is not to be taken as a limitation. The machine may be of the cylindrical scanning or of the flat-bed raster scanning type, and the original copy may be opaque and scanned by reflection, or transparent and scanned by transmitted light. Suitable provision may also be made for a change in the size of the reproductions from the original, concomitantly with the making of the screen plates. The description of the use of three color channels, with separate production of a black printer, is also subject to variation where desired, without departing from the inventive principles.

It should also be realized, that from the standpoint of the computer aspects of the invention, it is by no means essential that a direct engraving be produced by the color corrected signals which are developed. It is also feasible to use such signals, controlling a suitable optical dot-output transducer, for the successive preparation of photographic screened reproductions as color separations, for use in known ways in the graphic arts. Moreover, the apparatus can also be used to produce unscreened reproductions, or continuous tone separations, if the on-off modulation producing the screen frequency is replaced for example by a suitable high frequency carrier whose individual cycles cannot be resolved at the scanning or reproducing speeds.

*Overall description of the system*

For convenience of description, the system can be considered as comprising five major sections, as follows:

(1) Contrast control section which includes circuits for multiplying the primary (red, green, blue) original copy intensity signals by a function of those signals, As the three intensity signals are multiplied by the same function, no hue or saturation information is lost, although the brightness information may be altered.

(2) The matrix section which consists of circuits for linear adding and subtracting controlled amounts of red, green and blue and other correction signals to obtain, for example, cyan, yellow and magneta signals for recording or engraving. The latter three colors represent the color process printing inks and the corresponding signals represent an appropriate amount of that color which will be prohibited from being printed.

(3) The overlap correction circuits, which compute the non-linear corrections required by the fact that the color dots ultimately printed will overlap to a greater or lesser extent; for example, a yellow ink dot partly overlapped by a cyan color dot.

(4) The black printer circuit consisting of means for selecting the instantaneous maximum signal from amongst the primary (red, green, blue) signals derived from the copy and as altered by the contrast control circuits. This section may be omitted for certain applications, namely those in which adequate reproduction quality can be obtained with three color plates and no black printer.

(5) The undercolor removal circuit which will operate to prevent the ultimate printing of too much ink where the trapping of inks is a problem. This section may also be omitted in applications in which the adjustments in the preceding four sections are such that the printing of too much ink is impossible.

Fig. 1 of the drawings illustrates the above sections in combination, the components being designated relatively broadly as labelled blocks, subject to later detailed description. At the left of the figure, there is shown in diagram form the optical three-color scanning head comprising individual photocells (actually photomultipliers for good sensitivity and control), designated by numerals 10, 12 and 14, and receiving respectively the rays of light representing the respective intensities of the primaries such as red, green and blue. The original copy being scanned is designated by numeral 16, successive points thereof during the scanning operation being imaged by a lens 18 at an aperture of stop plate 20 in the usual manner. While filters or even specially sensitive cells could be employed for separating the chromatic constituents of the beam, it is preferred to utilize dicroic filters such as filter reflector 22 transmitting substantially all of the red light and reflecting the green and blue to a second dichroic reflector 24 transmitting in the blue and reflecting in the green. Auxiliary cut-off filters 26 are indicated for each cell.

The instantaneous output signals, in the form of monopolar pulse signals, are transmitted over conductors labeled R, G and B corresponding to the color information they carry. Since Fig. 1 is schematic, the conductors are to be understood as representing the flow channel, rather than physical wiring, the nature of the latter depending on the particular design. These channels pass, through multiplier circuits designated 28, 30 and 32, to the multipled inputs of the matrixing equipment 34. However, a portion of each signal is diverted to a maximum selector or "auctioneer" circuit 36, from which only the signal portion of instantaneously maximum amplitude is applied to the function former 38. The difference between the output of this function former and a constant input reference level signal at 40 is determined by the subtractor 42, and this difference is applied as the multiplied to each of the multiplying devices 28, 30 and 32. The outputs of these circuits, designated R', G', B' are what is applied to the inputs of the matrix computer.

The black printer signal output is obtained by diverting a portion of the signals from the multipliers to a second maximum selector 44, and the instantaneously maximum signal amplitude is forwarded to the output terminal 46 over channel B*k*, for use when the black printer plate is to be engraved. The engraved operation on the black printer is thus controlled in accordance with the signal which is, at any instant, the largest of the three primary signals.

The matrix computer 34 includes three separate and independent computers designated generally by numerals 48, 50 and 52, one for each of the primary color channels. The computed outputs are designated by M, Y and C corresponding to the magenta, yellow and cyan computed signals, and are made available at the terminals of a multiple switch 54 whose common terminal 56 extends to the equipment controlling the engraving tool, exposure transducer or other signal output utilization device.

The system as so far described will operate, imperfectly or on specialized subject matter, providing corrected color output signals conforming to the so-called linear portion of the group of Neugebauer equations, as will be amplified below. However, the invention further provides for individual correction functions applicable to the matrix computers, based on the further treatment of information derived from the output channels M, Y and C from the matrix computers and fed back to them, via the correction circuits 58, 60, 62 and 64. By means of certain allowable approximations and circuitry to be detailed below, the final outputs are put in form suitable for fully acceptable color signals conforming to the practical requirements of the color engraver.

An optional refinement covering the preventing of too much overprinting of ink is provided by the undercolor removal computer 66, also fed from the M, Y and C output channels and from other signal sources as will be explained. The optional nature of this refinement is indicated in Fig. 1 by the output selecting switch 68; an additional signal selecting switch 70 for the outputs of computer 66 permits manual selection of the modified signal information in channels M', Y', C' and B*k*. The black printer signal will of course be the same for either set of final outputs.

*Mathematical considerations*

Basically, the invention achieves its result by employing a system in which the hue and saturation information contained in any original color signal is carried through the equipment in terms of the ratios of the primary intensities. By maintaining these ratios while adjusting the brightness or intensity information, the hue and saturation information is not lost; that is, such information is kept invariant for brightness transformations. The necessity for the reasonable satisfaction of this criterion is well illustrated by the technique of making photographic color separations, a generally parallel problem. In that case, it is necessary for the operator to reduce individually the contrast of each initial separation, and this acts to desaturate the colors. Hence masking of one kind or another must be resorted to, not only to compensate for the printing process, but to resaturate the color information.

If a linear density relationship only had to be considered, it would only be necessary to multiply the original red, green and blue signals by the reciprocal of an exponential function of the brightness signal, corresponding to the black signal as being the maximum of the three color signals. Actually, it has been found that in the highlight regions no reduction of gamma can usually be used, and therefore the function of the brightness signal to be employed as a multiplier for the three primary signals is best found from the characteristics of the original copy, usually experimentally.

The brightness correction that must be made is thus a reduction in the neutral scale gamma. Prior art approaches usually consisted of making controlled density reductions in the individual separations, leading to a high degree of objectionable desaturation. Suppose, for example, that there is a green subject in a transparency with transmittances of red—10%, green—25% and blue—10%. For a linear density reduction of 2 to 1, the separations will have transmittances of 31%, 50% and 31% respectively. The saturation indicated by the ratio of green to red or blue is thus reduced by the ratio of 2.5 to 1.6. In the photographic method the saturation loss is restored by the masking procedure, thereby requiring the masks to perform not only the function of compensating for the inks but also compensating for the saturation reduction in the initial separations. A certain amount of hue shifting can also be expected. For a purple with transmittances of red—70%, green—20% and blue—50%, the 2:1 density reduction gives 85%, 45% and 70% and it can be seen by the change in red-blue ratio that a shift in hue must have taken place as well as desaturation.

Then, in order to maintain the proper hue and saturation while making a change in the characteristic curve of the neutral or equivalent neutral tones, it is seen that the red, green and blue transmissions or equivalent signals must always be multiplied by the same factor. The factor might be considered to be a function of the brightness when going into colors away from neutrals, but a luminosity factor, such as found by summation of appropriate amounts of the three primaries to approximate the Y function of the CIE tristimulus set, is found to be inadequate. A peculiarity of the equations used to solve for the printing ink characteristics, such as the Neugebauer equations, is that the neutral tones are the governing factor and the brightness as determined by a luminosity function is decreased when going into color. For example, the paper white might be a neutral at the extreme end of the scale. As one of the inks is introduced, the luminosity function is decreased—especially when magenta is being printed. Therefore, the factor chosen for brightness adjustment at this point can save computation at a later stage if it adjusts the brightness on the assumption that the colors away from neutral tend to darken only. This factor can most easily be obtained by using a function of the largest of the primary signals.

The contrast multiplying function thereby obtained is then based on the resultant printed copy and the characteristic required to transform uniformly detectable neutral tone steps in the original to the reproduction. The undercolor removal, the black printer, and even the printing process will affect the best shape for the contrast function. In general, the multiplying factor in very dark tones for four-color printing may be higher than the factor required for three-color printing—but this really depends on the amount of undercolor removal and the way that the black plate is inserted. In some printing processes the black plate can be handled as a "ghost" which can never go to 100%, or by a contrast function different for the black printer than for the color printers, or it can be handled as 100% in the black with less in the colors.

Fig. 2 of the drawings represents graphically a preferred shape for the contrast function as satisfactorily employed in practicing the present invention. It shows a compensated neutral gamma of about 0.85 in the highlight region, sloping off to a general value of about 0.46 for the darker portions of the subject matter. However, the particular shape employed can be varied as will be discussed below.

Fig. 3 of the drawings represents the Neugebauer equations in an inverted form well suited to electronic computation. The first four terms of each constitute the so-called linear corrections, and the remaining terms represent the further corrections that must be made in conformance with what has been said above. It is emphasized, however, that a rigorous solution of the equations is by no means essential to the production of color reproductions of good commercial quality. In fact, it is possible to produce relatively poor engravings even though the equations may be fully satisfied, due to poor choice of the parameters. In the equations of Fig. 3, $a_M$, $b_M$, $c_M$, and $d_M$, are constants chosen so that M equals zero when scanning a magenta patch, and equals unity when scanning cyan, yellow or white alone, the corresponding constants for the Y and C equations being obtained by cyclic interchange of the subscripts. F is the brightness multiplier, R, G and B are original primary intensities, and the other terms have the following meanings:

$M'_{MYC}=a_M+b_MR+c_MG+d_MB$ when scanning full 3-color overlap $M'_{MY}=a_M+b_MR+c_MG+d_MB$ when scanning magenta-yellow overlap $M'_{YC}=a_M+b_MR+c_MG+d_MB$ when scanning yellow-cyan overlap $M'_{MC}=a_M+b_MR+c_MG+d_MB$ when scanning magenta-cyan overlap $$S_K=1-(1-M)(1-Y)(1-C)$$
$$S_R=1-(1-M)(1-Y)$$
$$S_G=1-(1-Y)(1-C)$$
$$S_V=1-(1-M)(1-C)$$

the other terms being obtained in an obvious manner (for equations Y and C) by cyclic interchange with the equations for M.

The electronic computation of the first four terms above, those in M′, is quite simple to accomplish. According to the invention, the computation of the terms of the type indicated in the second set of four terms is simplified by the assumption, found valid in practice for the present application, that $S_K$ is approximately equal to $$\tfrac{1}{2}\,\text{Max}\,(M, Y, C)+\tfrac{1}{2}\,(M+Y+C)\Big|_{\text{Limit}=1}$$

i.e., the average value of the instantaneously greatest of the printer signals and of the sum of the printer signals not exceeding unity. "Unity" here means the reference value signal of constant level, obtained from a square pulse generator producing the "screen" of the engravings or separations as described in the Boyajean patent. Hence the value of $1-S_K$ occurring in equations 1 to 3 of Fig. 3 can readily be obtained.

A different kind of term, typically $S_K-S_G$ occurs also in the equations of Fig. 3, and according to the invention its value is given with a good degree of approximation, noting that $S_K-S_G=M(1-Y)(1-C)$, by:

$$\tfrac{1}{2}\Big[\text{Max}\,(M, Y, C)-\text{Max}\,(Y, C)+\Big\{M-(M+Y+C-1)\Big|_{+\text{only}}\Big\}\Big|_{+\text{only}}\Big]$$

i.e. one-half of the instantaneously greatest of the printer signals reduced by the maximum as between the Y and C signals, and increased by the positive value only of the difference between M and the positive value only of the sum of the three printer signals from which unity has been subtracted. A satisfactory mathematical notation for such complicated relationships does not seem to exist. The same relationship can be expressed by a set of three equations, as follows, which are given in the interests of a complete understanding:

$\tfrac{1}{2}[\text{Max}\,(M, Y, C)-\text{Max}\,(Y, C)+M]$ if $M+Y+C$ is less than 1, $\tfrac{1}{2}[\text{Max}\,(M, Y, C)-\text{Max}\,(Y, C)+1-(Y+C)]$ if $M+Y+C$ is greater than 1 and $Y+C$ is less than 1, and $\tfrac{1}{2}[\text{Max}\,(M, Y, C)-\text{Max}\,(Y, C)]$ if $Y+C$ is greater than 1.

Diodes are used in the circuitry to maintain positive signal sense where needed by these approximations.

*Contrast or brightness control*

Figure 4:
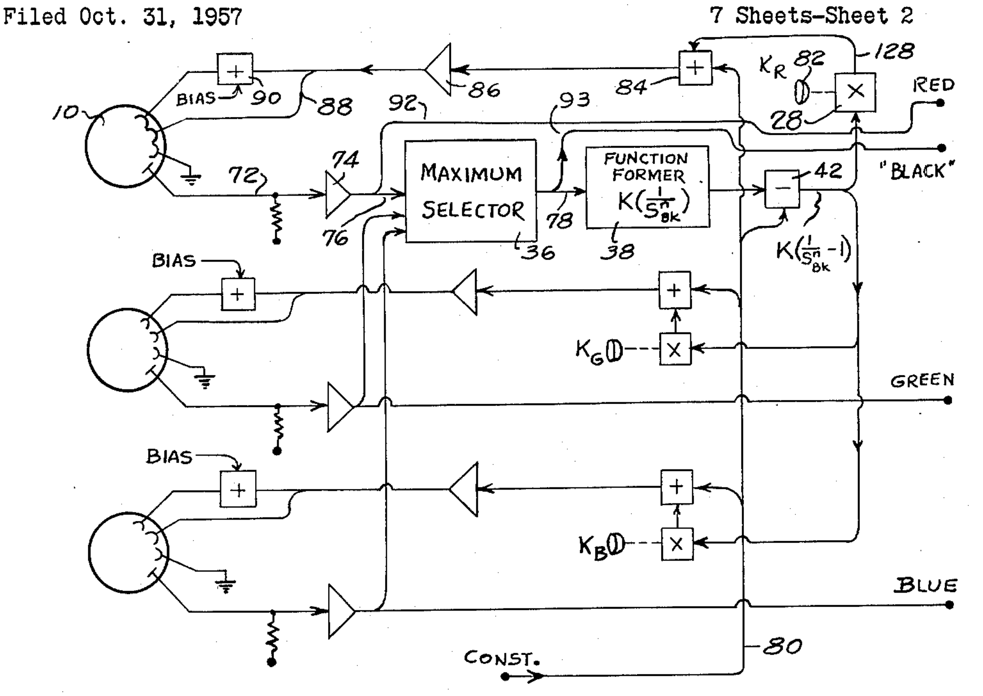
Fig. 4 is a schematic block diagram of the brightness control system employed in the preferred form of the invention, employing a novel feedback arrangement for the control of the photomultipliers used in the optical scanning head of the equipment.

Fig. 4 of the drawings shows in schematic form this section of the complete equipment, which is approximately the portion of Fig. 1 extending from the photomultipliers up to the matrix computer 34. Taking the red signal channel as typical, the raw signal from the anode of the red photomultiplier passes over conductor 72 to amplifier 74 and thence via 76 to the maximum selector 36, which passes to its output at 78 only the instantaneously largest of the three input signals, and of which a portion proceeds to the function former 38 to be described below. The output of the function former proceeds to the subtraction circuit 42 where the difference from unity signal value (supplied over lead 80) is obtained. Again, in the typical case of the red signal channel, the said difference is applied as the multiplicand to the multiplier 28. The multiplier is supplied by the manual control by which the value of $K_R$ is set in, and the sum of this product and the unity signal, obtained in adder 84, is amplified as at 86 and a portion applied to the last-but-one dynode of photomultiplier 10 over lead 88. A second portion is added to a manually-controlled bias signal at adder 90 and applied to the next preceding dynode, as will be described below. The final output signal, after transformation in the manner indicated, is applied to lead 92 and thence to the "red" output terminal.

The signal channels for the green and blue signals will be obvious from an inspection of Fig. 4, in the light of what has been said; it is these signals which are used in the subsequent matrixing to be described in a following section. It may be noted that Fig. 4 illustrates a variant manner of obtaining the black signal. For clarity, Fig. 1 illustrated a separate maximum selector 44 for this purpose. Fig. 4 shows how the same maximum selector 36 may be used for obtaining the black signal, a portion of its output being diverted, before function forming, over lead 93 to the "black" output terminal.

Figure 5:
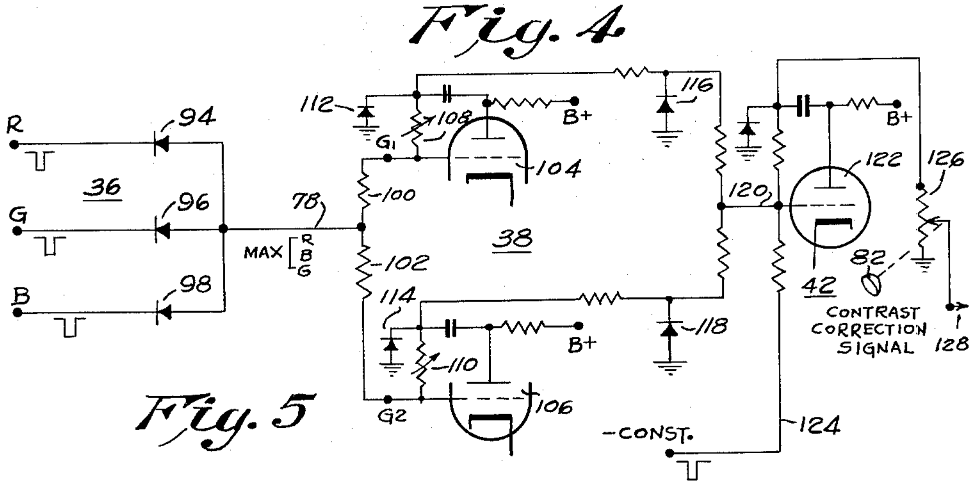
Fig. 5 is a schematic wiring diagram of the contrast computer section of the equipment, providing manual adjustment of the shape of the correction function in two different tonal regions of the contrast range, as represented for example in Fig. 2.

A detailed schematic of the maximum selector 36, function former 38, subtractor 42 and multiplier 82 is given in Fig. 5 of the drawings. Here, the maximum selector 36 comprises a set of three diodes 94, 96 and 98, having a common output terminal at 78 and individually fed by the raw R, G and B signals. Lead 78 thus carries the instantaneous maximum of the three inputs, in the well-known manner of auctioneer circuits. The signal is divided through resistors 100 and 102 and applied to respective variable-gain amplifiers 104 and 106 suitable for the monopolar pulse operation, for example A.C. feedback amplifiers. Variable resistance 108 adjusts the shape of the correction function in the high mid-tone region, by controlling the length of the characteristic in which linearity is preserved to obtain the equivalent of highlight masking, and variable resistance 110 provides control for the shadow region. The diodes 112, 114 maintain the desired monopolar operation of the present circuitry by operating as clamps to prevent the signal from shifting relative to the zero axis in such a way as to become in effect a two-sided signal. It is to be understood that such considerations would not apply in the equivalent electrical systems designed for use with signals expressed as D.C. modulated carriers, or for two-sided signals throughout, and these details are therefore given for consistency in the disclosure, rather than as essential limitations. Zener diodes 116 and 118 are preferably used as limiters, to avoid the necessity for separately biased diodes for this function. The combined outputs of the two operational amplifiers at 120 are applied as one input to the conventional summing amplifier 122; the other input is the (negative) unity amplitude signal obtained from lead 124, so that the circuit taken together performs the subtraction indicated as a whole by numeral 42.

The multiplication setting indicated at 82 corresponds to the same multiplier device so numbered in Fig. 4; as common in the art, multiplication by a machine variable (here, a manual input at knob 82) is well performed by a simple potentiometer 126. The contrast or brightness correction signal is thus available at 128, and the equivalent lead or terminal in Fig. 4 is therefore likewise marked for clarity.

Figure 6:
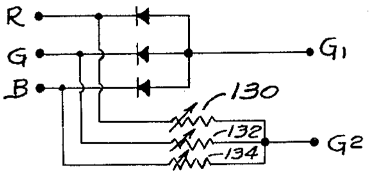
Fig. 6 is a schematic wiring diagram of a modified form of the left-hand portion of Fig. 5, up to the connections to the grids of the tubes in the latter figure.

A modified form of maximum selector is illustrated in Fig. 6, which may be applied to Fig. 5 by connecting the terminals G1 and G2 to the corresponding points in the latter figure in place of the elements preceding them. In this case, the auctioneer function is applied only to the operational amplifier 104, the other amplifier being supplied with a signal which is the sum of the R, G, B signals, each weighted by the adjusted value of its respective resistor 130, 132, 134.

*Photomultiplier Modulation for contrast control*

Figure 7:
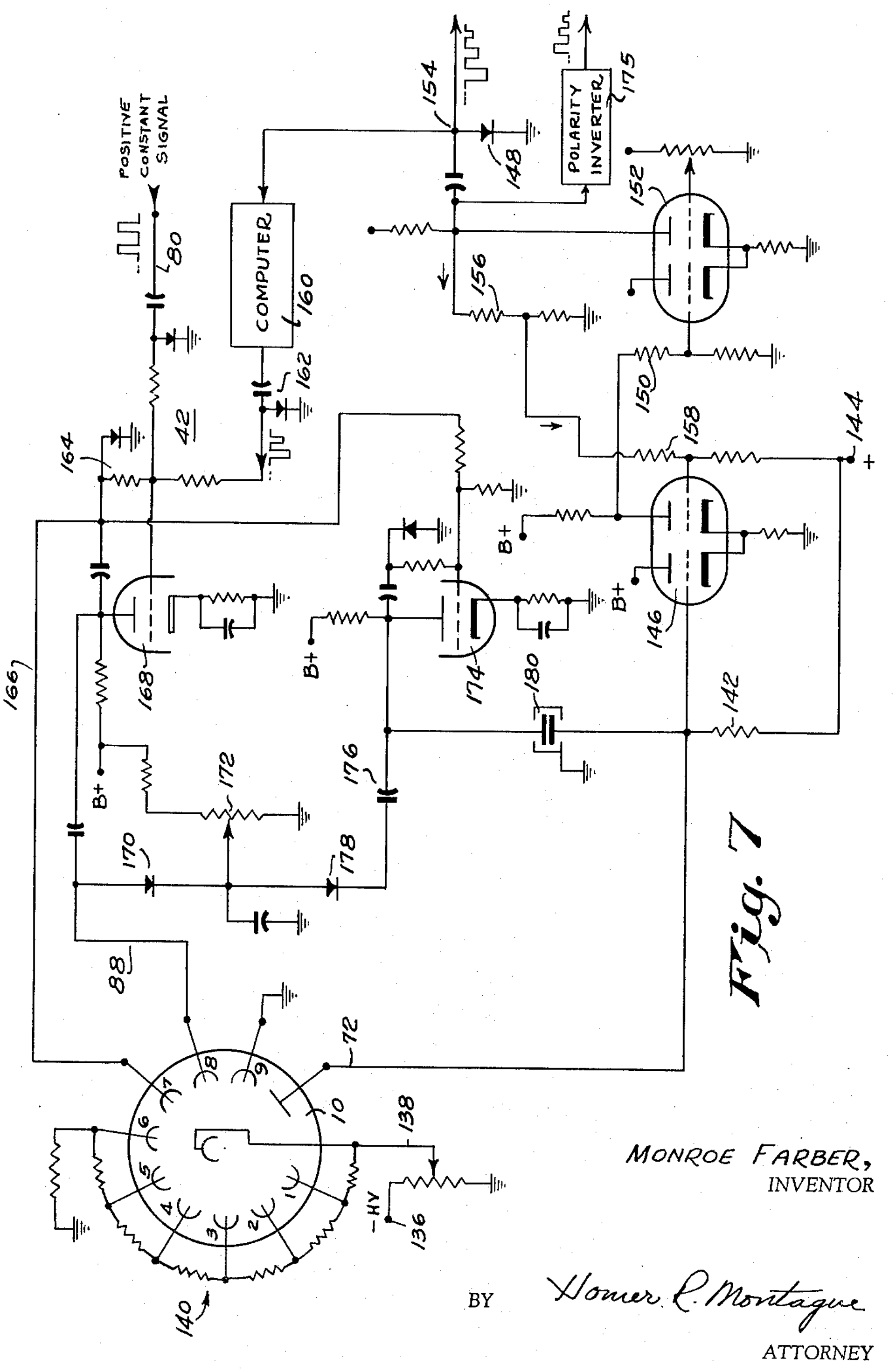
Fig. 7 is a schematic wiring diagram of a preferred manner of obtaining a desired adjustable functional relationship between the effective signal output of one of the photomultiplier tubes of the scanner, and its illumination, by controlling the effective gain of the combination through control of the feedback voltages applied to one or more of the dynodes.

This portion of the computer, already generally shown in earlier figures, is illustrated in more detail in Fig. 7 of the drawings, the showing again being restricted to the circuitry for the red channel, for simplicity. Generally speaking, the circuit provides an output which is proportional to the cathode illumination of the photomultiplier, and yet is a concurrent function of some other variable, or is a non-linear function of the cathode illumination. While the effect could be produced by conventional gain control employing direct coupled feedback to converter tubes or "electronic" multipliers, objections commonly associated with the latter are avoided by the present scheme. Such objections include higher effective noise level, greater complexity, increased power requirements, and greater tendency to drift.

The dynodes in photomultiplier 10 are designated in order by the reference numerals 1 through 9, and the anode or output lead is again designated 72, as in Fig. 4. Numeral 136 designates a high negative potential source, of which an adjusted (for calibration) portion is applied by lead 138 to the photocathode and to the usual bleeder string 140 which thus supplies increasingly positive voltages in turn to dynodes 1 through 6, in the usual way. The anode load resistor 142 is connected to its proper positive voltage source 144. The anode current through this load resistor provides a voltage drop which is then amplified by the direct-coupled amplifier comprising tube 146. As the D.C. component of this signal is not to be used, drift does not affect the result. The amplifier 146 increases the signal voltage to the point such that clamping of the one-sided pulse signal (as mentioned earlier herein) can be accomplished without affecting linearity over a range, caused by any deficiencies in the diode transition region.

The clamp diode for amplifier 152 is indicated at 148, the direct amplifier signal channel being indicated through resistor 150 to the input to the second stage amplifier 152 and over the usual coupling condenser to the output terminal 154. A feedback path between the stages is shown including resistors 156 and 158. The "computer" box may here be thought of as encompassing the maximum selector 36 and function former 38 of Fig. 4. The negative computed output signal from this computer is clamped by diode 162 and subtracted at the junction in 42 from a positive-going constant signal from lead 80. The resultant is inverted in polarity by amplifier 168 and a portion is coupled directly via resistor 164 to the seventh dynode over lead 166, and a portion is applied, at suitable bias level, to the eighth dynode over lead 88. A clamp diode for the latter voltage is indicated at 170, and a bias adjusting potentiometer at 172.

A phase inverter 174 is indicated, supplied from the same output of amplifier 168. The inverted signal from the phase inverter is applied over transient balance condenser 176 and through a balance clamping diode 178 to the bias output terminal of potentiometer 172, to prevent transient shifts in the operating potentials applied to the dynodes. The same inverted signal from the phase inverter is also applied through a neutralizing condenser 180 to neutralize the internal capacity coupling of the photomultiplier 10; that is, between its dynodes and the anode. The transient-balance circuit would not be required if a two-sided or bipole signal were employed, which is of course within the scope of the present disclosure.

Preferably, with the configuration shown, the biases on dynodes 7 and 8 are so adjusted that with no signal (illumination) they collect all of the electrons emanating from the preceding dynodes. Equally well, they can be biased negatively (with respect to the preceding dynodes) so as to repel all the electrons and thus to obtain cut-off conditions. Other opposing dynodes can also be modulated to act as an electron gate. Additionally, more than two dynodes can be so modulated, to obtain higher dynamic ranges of signals.

The importance of the special features of the computer section just described, for color correction in photoelectric half-tone engraving, stems of course from the requirement for modifying the signal levels of all three of the color signal components, to change the contrast values, while maintaining the ratios of the signals unaltered, and hence to avoid changes in hue and saturation. The circuitry described, when properly adjusted and used, satisfactorily accomplishes this result with a minimum of complication.

*Color matrix circuitry*

Figure 8:
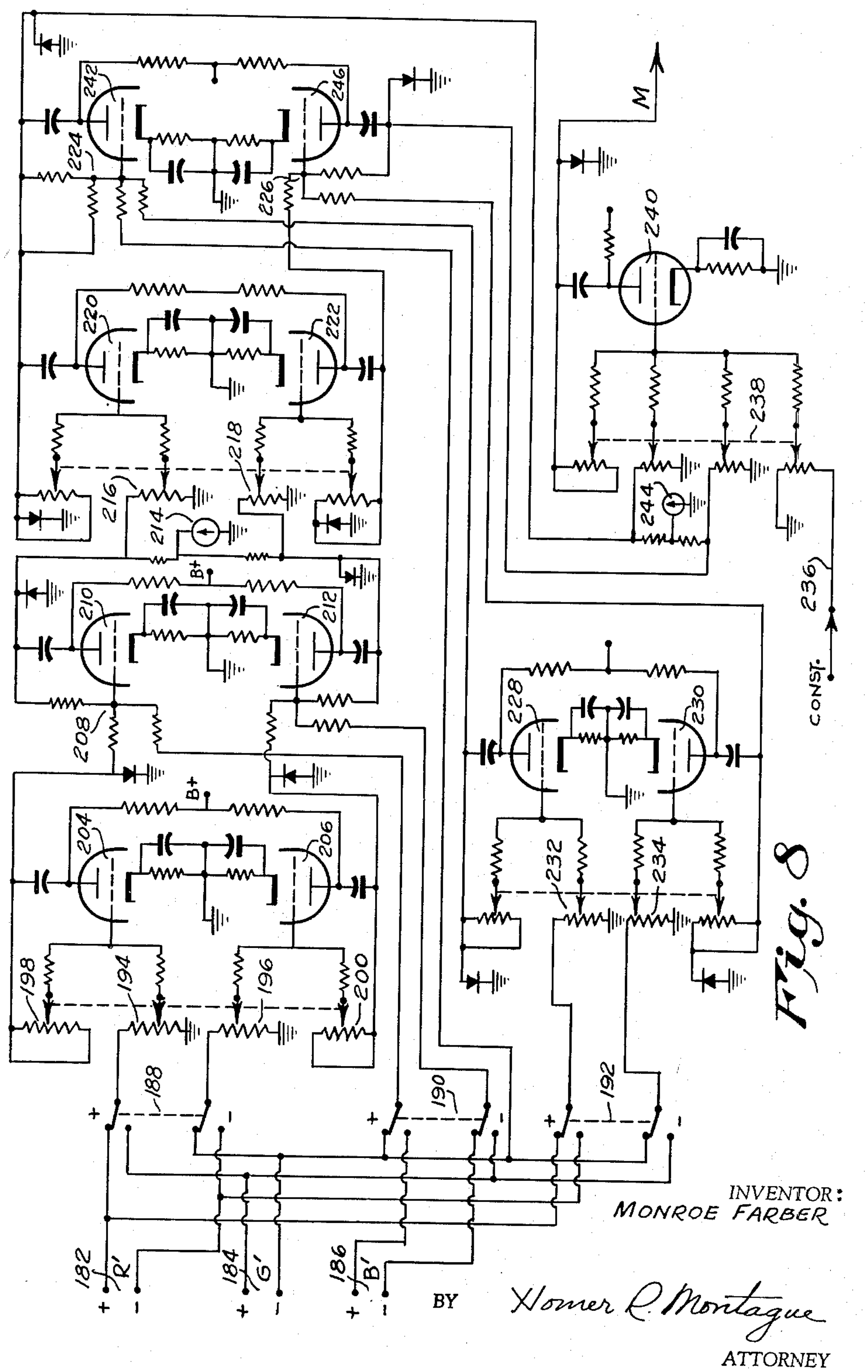
Fig. 8 is a schematic wiring diagram of one section, being typical for the other sections, of the matrix computer of Fig. 1, to produce an unique channel output controlled jointly by three color signal input channels.

Since signals corresponding to all three of the modified photomultiplier outputs are required to form the complete output or control signal for each of the output channels individually, the matrix arrangement of Fig. 1 is provided, and is shown in its essential details in Fig. 8. At the left side of this figure, both positive and negative polarities of the modified signals R′, G′, and B′ are shown as available at terminals 182, 184 and 186. These input terminals are multiplied in a permutated fashion to three double-pole, double-throw switches 188, 190 and 192, hereafter denoted "sign" switches. Thus, the common or output terminals of switch 188 can, by operation of the sign switch, be connected to +R′ and −G′ or to +G′ and −R′, and so on. The sign switch output terminals, for the uppermost channel in Fig. 8, are connected to ground through the windings of potentiometers 194 and 196 whose variable taps are tandem-connected with the taps of compensating potentiometers 198 and 200. All of these taps are ganged, as indicated in the figure, and the taps of each pair are connected through equalizing resistors (of which one is indicated at 202) to the grids of the respective amplifier sections 204 and 206. These are feedback linear amplifiers providing, in the case of amplifier 204, a signal value at junction point 208 representative of the +R′ or +G′ signal, depending upon the position of sign switch 188. The compensating potentiometer 198 in the amplifier feedback path eliminates the variable effects of potentiometer loading. The relation of electrical and mathematical polarities is elaborated below under an appropriate subject heading.

It will be seen that junction point 208 is also fed by a signal from the upper terminal of sign switch 190, capable of selecting either −G′ or +B′. Junction point 208, therefore, being connected to the control grid of the following amplifier 210, constitutes the point of addition (or subtraction) of the selected values of the modified input signals to the matrix. Likewise, amplifier 212 is driven in accordance with the sum (or difference) of the selected values of the modified signals presented at the lower terminals of switches 188 and 190. The summed values are applied to the indicating meter 214 and, via potentiometers 216 and 218, to the further amplifiers 220 and 222. The outputs of the latter pass to further multiple junction points 224 and 226, where permutatively selected signals from switch 192 are similarly additively combined with the partial resultants already described. The amplifiers 228 and 230 for the latter channels are fed from ganged potentiometers 232 and 234.

The constant or unity signal level at conductor 236 is added in via potentiometer 238 and amplifier 240, whose output constitutes the final signal embodying all of the linear color corrections required by the approximated equations described above. The addition (or subtraction) performed in amplifiers 242 and 246 provides a combined signal whose amplitude can be read on meter 244.

*Relationship between electrical polarity and mathematical sign*

From the foregoing, it will have been appreciated that two different kinds of polarity are involved in the system. One is actual pulse or electrical polarity taken with respect to some reference level, herein taken as the ground level. The other is the mathematical sign polarity, indicating for example the distinction between adding and subtracting the absolute values of the magnitudes involved. In Fig. 8, the inputs are shown so that the mathematical polarity is the same as the electrical polarity. Each feedback amplifier is actually a phase inverter which inverts the electrical polarity. For example, amplifier 204 reverses the electrical polarity even though the mathematical polarity or sign may be considered to be the same as the input. The plate voltage at an amplifier may be looked upon as the sum of the inverted A.C. input signal plus a D.C. component. At points beyond the output coupling condenser, the D.C. component is removed, and the clamp maintains the no-signal portion of the cycle at ground potential.

Clamped amplifiers, of the type illustrated herein by way of example, can be clamped for one electrical polarity only, and if the other polarity is fed into the input an objectionable transient will be produced. This is the reason that separate channels must be maintained for each polarity, for use in taking the difference of two signals, whereas with double-sided operation the difference could be obtained immediately. Such variations are of course not excluded from the scope of the present invention.

It will be noted that the signal output at 154 in Fig. 7 is shown with negative electrical polarity. To obtain the positive corresponding signal, a single-stage feedback amplifier, like amplifier 174, can be used, and such an inverter is indicated schematically at 175 in that figure. Switches such as those indicated at 188, 190 and 192 in Fig. 8 are employed to permit reversal of the mathematical polarity while maintaining the correct electrical polarities as required by the clamp circuits at the amplifier outputs.

*Operational procedures*

The arrangement just described is very simple to operate, because it permits the operator to make the necessary adjustments in a logical and simple order, merely by directing the color scanner head of Fig. 1 to sample portions or "swatches" of the respective pure colors in which the reproduction is to be accomplished. Thus, for adjusting the magenta channel as shown in Fig. 8, the user will scan cyan and adjust the ganged potentiometer 194—200 until the additive voltage at meter 214 is zero. It may be necessary to change sign with either switch 188 or switch 190 to accomplish this. Then, while still scanning cyan, he will adjust potentiometer 216—218 to zero (ground end) or disconnect the said potentiometer from 214, and adjust potentiometer 232—234 (and switch 192) until the additive voltages at meter 244 give full scale (100%) reading. Next, he will scan yellow and adjust 216—218 (and if necessary switches 188 and 190 together) until the additive voltages at meter 244 are 100%. Finally, he will scan magenta and adjust potentiometer 238 for zero output at the output lead M. It may here be mentioned that the reason for setting the magneta channel to zero when scanning magneta is that, in the usual photoelectric engraver with which the present computer is especially intended to operate, the maximum printing coverage is represented by the minimum penetration of the engraving stylus into the surface of the sheet or plate being engraved.

The foregoing describes Fig. 8, which of course represents only the magenta channel through the matrix; in other words, channel 48 of Fig. 1. The other channels 50 and 52 will be identical, except for the interchanging of the red, green and blue inputs in a cyclic manner. The corrections made by this matrix alone are only the corrections which have been called "linear" in the earlier description. The manner of including the overlap and undercolor removal corrections will be described below.

*Three-color brown corrector*

Figure 9:
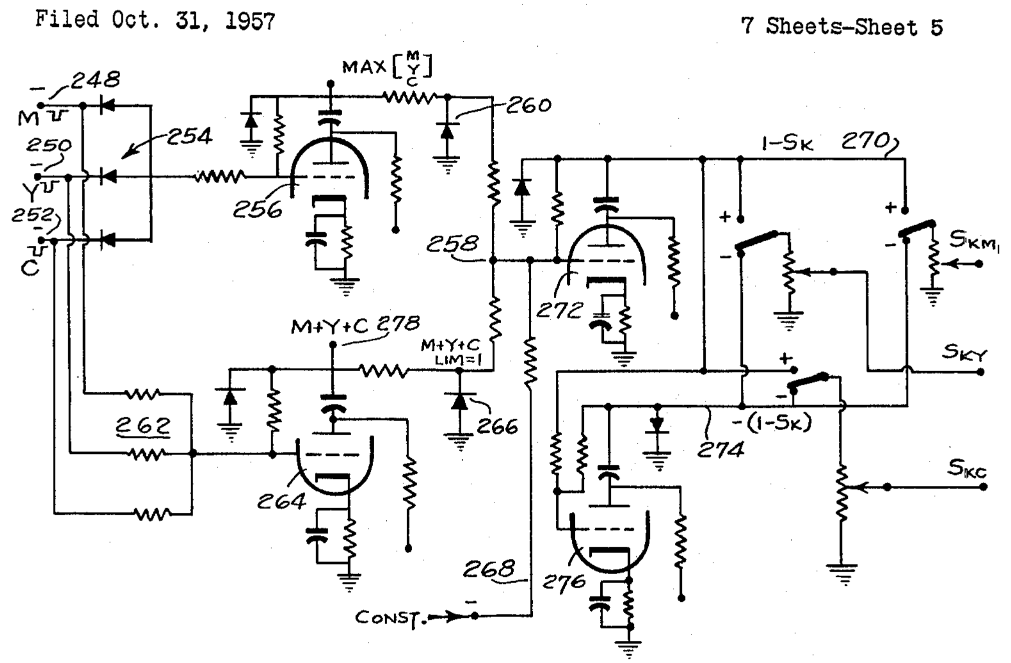
Fig. 9 is a schematic wiring diagram of a three-color (brown) overlap corrector also forming a component of the Fig. 1 arrangement.

The three-color (brown) overlap corrector circuit is indicated in Fig. 1 at numeral 60, and is detailed in Fig. 9 of the drawings. It computes the $S_K$ term in the equations listed above under "Mathematical considerations," making use of the approximation already explained.

The M, Y and C values provided by the matrix computer 34 of Fig. 1, and one channel of which was just described in connection with Fig. 8, are presumed to be available at the terminals 248, 250 and 252 at the left of Fig. 9. A typical maximum selector circuit 254, such as already described, applies to amplifier 256 the maximum of the instantaneous signal values, while the scanner is scanning a three-color overlap patch produced by the reproduction inks. The maximum value is then applied by the amplifier to junction point 258, and a maximum limiter 260 may be provided if trouble develops from higher-than-white signals. Similarly, the same inputs are summed by resistors 262 and applied to the amplifier 264, and the resultant limited by limiter 266 to a value equal to that of the constant value or unity signal of negative phase, introduced at lead 268. Mathematically, the limit is established at $M=Y=C=1$ when white is being scanned. Electrically, the constant fed into 268 depends upon the relations of the summing resistors, but should be such that if the grid of 256 is grounded, the output of 272 (at lead 270) will be one-half of the output for white. Likewise, if the grid of 264 is grounded instead, the same relation will be true. If neither is grounded, there should be full output. Obviously, the designer has some flexibility in choosing summing resistors, amplifier gains, constant-signal amplitude and so on. The important criterion is that the output obey the mathematical relations as stated. In brief, the constant level and the functions available at 260 and 266 merely represent the mathematical values, and suitable scale factors are to be used to relate the mathematical values to the electrical values, as will be obvious to those skilled in computer design.

The polarity relations should be clear from what has already been said above on this subject. Thus, inputs M, Y and C are used in the mathematically positive sense, but are electrically negative. The functions at the output of 256, and at 278, are positive in both senses. Obviously, one can invert the electrical signal for either polarity so long as the same polarity is used both for addition and maximum selection.

With the above in mind, it is easy to adjust, for example, so that resistive division by the factor of two at junction point 258 gives the average of the sum, as required by the approximation formula given earlier. The term $1-S_K$ is given by the signal on lead 270 from amplifier 272, while the term $-(1-S_K)$ is given by the signal on lead 274 from inverter 276. The switches and potentiometers indicated in the output-combining circuits are to be adjusted to provide zero output as indicated by a meter, when the three-color overlap is being scanned. Note that all of the corrections $S_{KM}$, $S_{KY}$ and $S_{KC}$, for the magenta, yellow and cyan channels are provided by the same circuit.

*Two-color overlap correctors*

Figure 10:
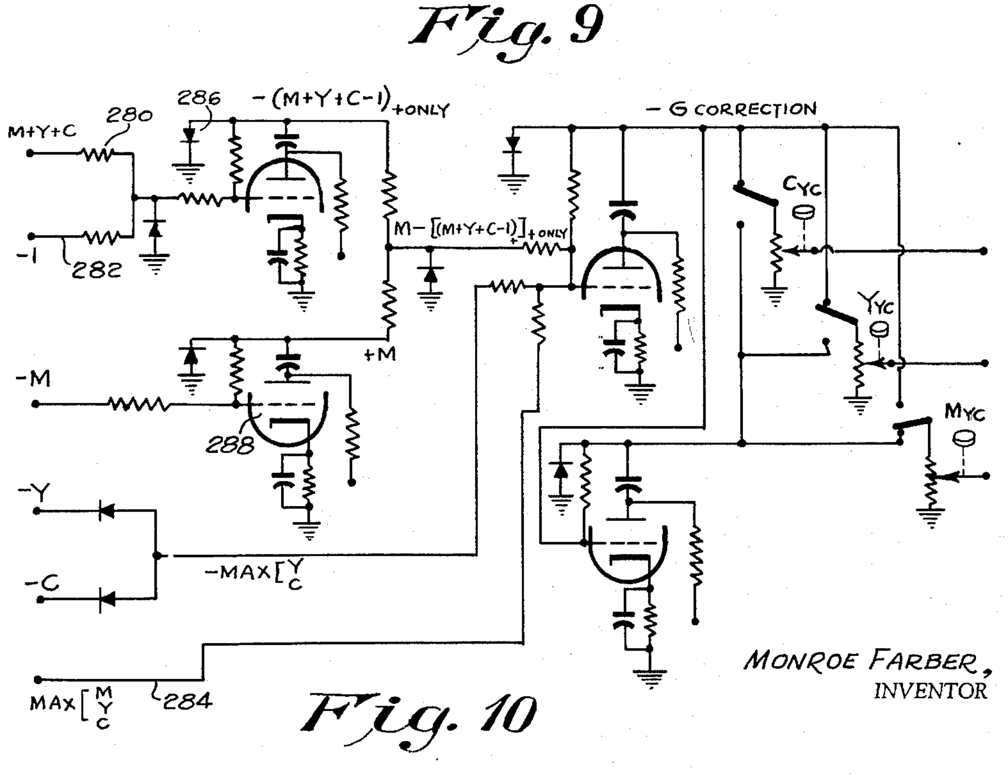
Fig. 10 is a schematic wiring diagram of a typical two-color overlap corrector representing three analogous such devices in Fig. 1.

Fig. 10 of the drawings details a typical two-color overlap correction circuit; specifically, the green (YC) corrector 58 of Fig. 1. However, the correctors 62 and 64 can readily be visualized by interchange of the color designations in Fig. 10. The circuit calculates the approximation given earlier for the $S_K-S_G$ term. Since the term $M+Y+C$ has already been obtained for use in Fig. 9, namely at the terminal 278, the same value is presumed available through resistor 280 in Fig. 10. The negative unity or constant signal is applied at input 282, the negatives of the M, Y and C signals at the leads so marked, and the instantaneous maximum thereof, as from the output of amplifier 256 in Fig. 9, is present at lead 284. Diode limiter 286 provides the positive value only for the negative of the sum of M, Y and C minus unity, and inverter 288 provides the value $+M$. The way in which the other components of the approximation are combined will be obvious from a perusal of the remainder of Fig. 10, and in the light of the techniques already described in detail. As before, the output for a given two-color correction channel is adjusted to zero when the scanner head is scanning the appropriate two-color overlap of the reproduction inks or pigments.

*Undercolor removal circuit*

Figure 11:
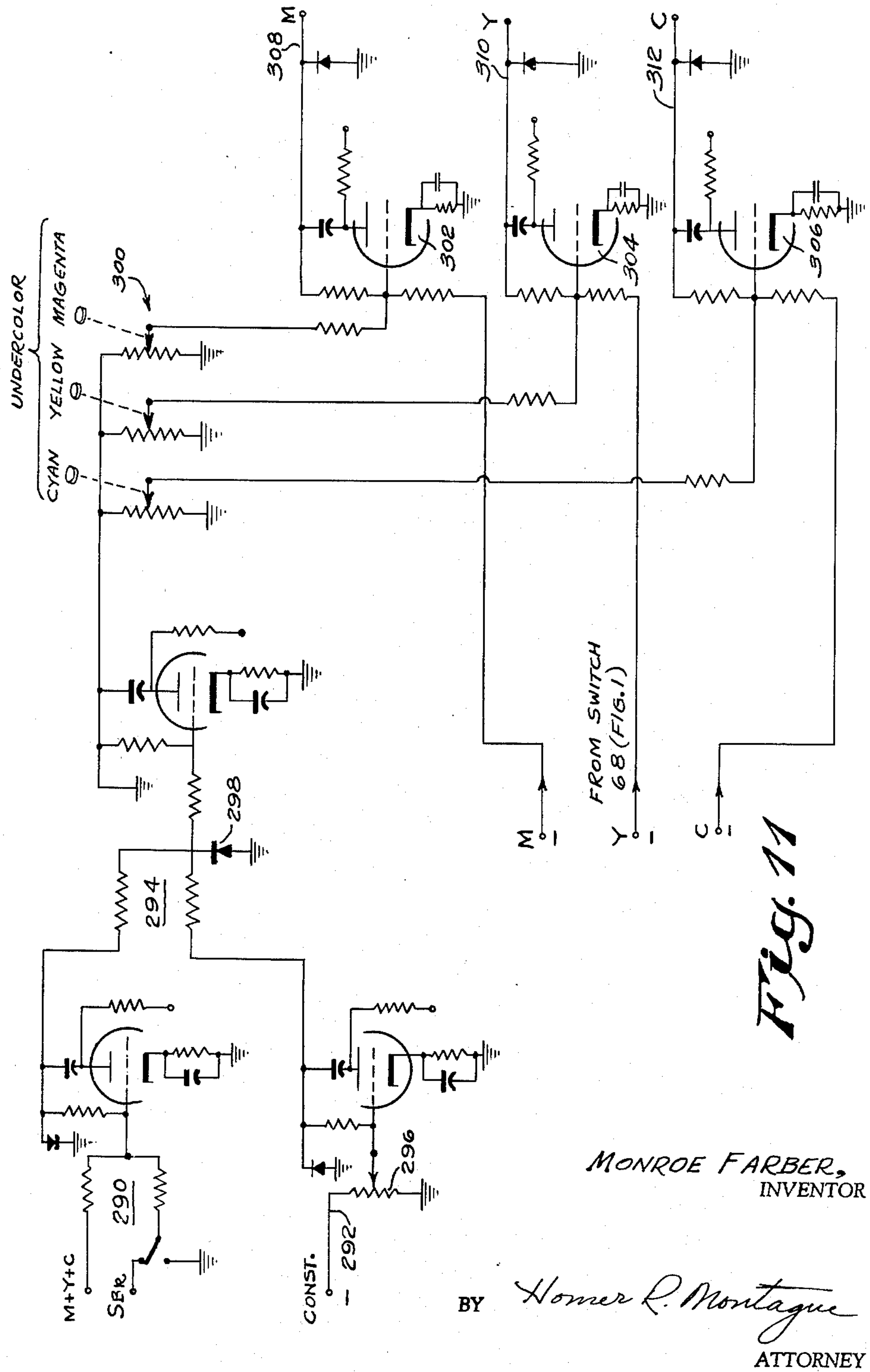
Fig. 11 is a schematic wiring diagram of the undercolor removal circuit shown in block form in Fig. 1.

Fig. 11 of the drawings illustrates in detail a preferred form of the undercolor removal circuit designated broadly in Fig. 1 by numeral 66. Before proceeding to explain the circuit, the rationale of undercolor removal will be discussed by way of background. Undercolor removal is particularly useful in making engravings for high speed wet printing where it is found difficult to print one wet ink on another. This can be taken care of in two ways. An approximate way is by adjusting constants and overlap corrections (as above) so that in neutral or dark tones the dot areas never exceed those values which are required for wet ink trapping. With a black printer and high brightness increase (especially in dark tone regions) this gives a fair result, and is likely to be satisfactory particularly with the relatively cheaper printing inks in which the three-color brown corrections maintain small dot areas and consequently restrict the neutral tone range.

A more exact procedure, applicable to higher quality work and of more flexible utility, is that which will be illustrated. Briefly, this involves computing the sum of the dot areas, and when this sum exceeds a certain limit, any excess is used to correct the dot areas. For the present computer, which operates on the basis of the fractional area not covered by the dot, namely the printer signal, the sum of the printer signals is subtracted from a minimum signal sum representing the total possible dot area (400% for four color plates) reduced by the maximum usable dot area. The difference signal is then allotted to the printer channels to bring up the signals to the minimums. For example, one publisher requires a minimum of 240% dot area to be allotted in a neutral tone as 100% for black, 60% cyan, 45% magenta and 35% yellow. In the computer this is achieved by subtracting the sum of all four printer signals from 1.6 (fractional dot area basis), multiplying by 0.4/1.6, 0.55/1.6 and 0.65/1.6, and adding these to the cyan, magenta and yellow signals respectively. If the sum exceeds 1.6, no correction is made.

Fig. 11 details a preferred way of implementing the above procedure. The sum of $M+Y+C$ is readily obtained, e.g. from point 278 in Fig. 9, and added to the black signal by the adder 290, whose output is subtracted from a signal derived from the constant level at 292 in the circuit 294. Potentiometer 296 allows the constant to be adjusted as desired, for example of the 1.6 value mentioned in the preceding paragraph. A diode 298 prevents any negative values from being transmitted to the following circuit, so that the correction is ignored if the sub exceeds 1.6. The portions of the correction signal added to the M, Y and C channels are selected by the manual controls 300 shown as potentiometers, and applied to the control grids of respective amplifiers 302, 304 and 306 which also receive the input signals additively as via the control switch 68 of Fig. 1 to provide the modified output signals at terminals 308, 310 and 312.

The computer disclosed herein, as earlier stated, is especially designed to operate with single-sided square wave signals, and while this facilitates many of the computations, it requires clamping at every amplifier stage, as shown by the numerous clamp diodes included in the schematics. Many of these circuits could be simplified if a two-sided wave were used. For example, in Fig. 8, duplication of circuits to keep positive and negative signals separate until the final summation could be eliminated, as could the precision potentiometers needed to keep the positive and negative signals tracking together. However, the use of two-sided signals would actually complicate the computation of non-linear functions as is done in Fig. 9. While the particular arrangements shown are presently preferred as the optimum combination, it will be understood that the inventive principles are not necessarily limited to the circuits exactly as shown in the drawings.

Figure 12:
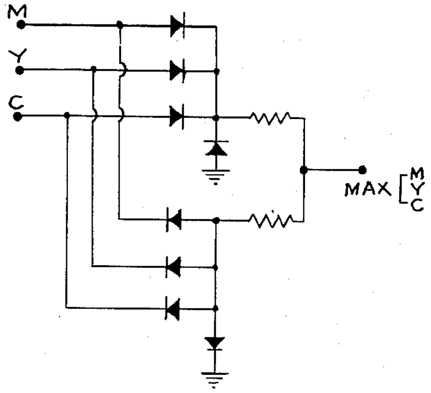
Fig. 12 is a fragmentary schematic diagram of a modified form of maximum selector circuit employed in apparatus using two-sided signal information.
Figure 13:
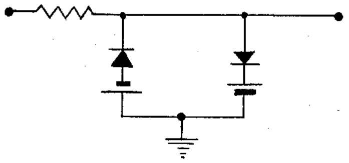
Fig. 13 is a similar schematic of a preferred form of signal amplitude limiter used in the apparatus when two-sided signals are to be handled.
Figure 14:
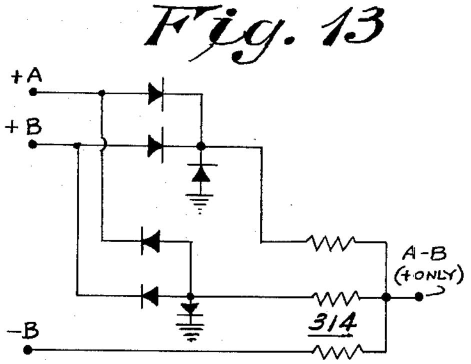
Fig. 14 is a schematic diagram of a special form of signal subtractor to provide a positive output polarity regardless of the respective amplitudes of the inputs, again for dealing with two-sided or bipolar signals.

When using a limiter as a computing element, some control over the function smoothness is possible, by altering the wave shape from true squareness; for example, by introducing capacitance to ground in the high impedance circuits, or by using small coupling condensers. Figs. 12, 13 and 14 show the subcombination modifications typical of a similar computer using two-sided signals. In Fig. 12, a maximum selector is shown, using three diodes for one polarity and three other diodes for the other, to maintain the polarities separate until selection has been made. Fig. 13 shows a typical two-polarity limiter, again employing a separate diode for each side of the signal. Fig. 14 shows an arrangement for obtaining a difference signal of one phase only; two pairs of diodes first select the maximum as between +A and +B, and the negative of the subtrahend is then algebraically added as by resistors at 314. Such a circuit would be employed in connection with Fig. 10.

*Matrixing variant*

Figure 15:
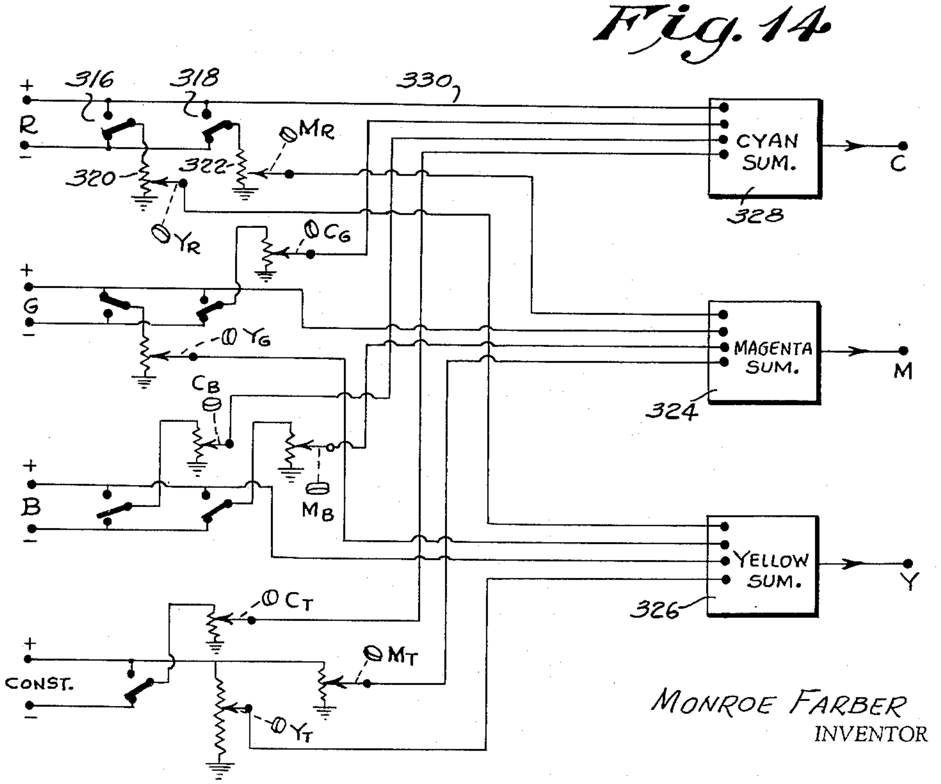
Fig. 15 is a schematic diagram, partly in block form, of a simplified matrixing scheme applicable to solution of the color equations but omitting the overlap corrections, which is feasible with certain inks and printing applications.

Fig. 15 of the drawings illustrates a simplified form of matrixing (generally equivalent to that shown in Fig. 8) eliminating any provision for the overlap corrections. While considerably simpler than Fig. 8, it has the disadvantage that all of the corrections must be computed beforehand by analysis of the original copy and the printing parameters. It cannot be adjusted empirically in the manner described for Fig. 8. Tracing the red channel, switches 316, 318 permit either polarity of red signal to be applied to respective potentiometers 320, 322 for delivery to the yellow and magenta summation circuits 324, 326 respectively, and the positive red signal is applied directly to the cyan summation circuit 328 as by lead 330. Exactly similar circuits provide for the green and blue signal portions applied to the summers, and a comparable circuit permits the constant or unity portion to be included in the summations. When the potentiometers are set as computed in advance, the criterion of constant ratio of primary intensity signals can be satisfied as in the more elaborate form earlier described. The overlap corrections not shown can of course be included if desired, by controlled feedbacks from the outputs marked C, M and Y at the right hand side of the figure.

While the invention has been disclosed herein in connection with certain preferred embodiments and variations thereof, various alternative ways of arriving at equivalent results will occur to those skilled in the art. All such variations as fall within the true spirit and scope of the appended claims are considered a part of the invention.

What is claimed is:

1. A computer for producing, from a set of varying input signals corresponding to the primary color intensities of an original object, a set of derived signals correctly representing the temporally varying optimum control amplitudes of polychrome image reproducing apparatus; comprising means for modifying each of the input signals in accordance with a predetermined signal-ratio preserving function of the instantaneously maximum one of said signals, and matrix means for intermixing a function of each of said modified signals with the same function of each of the others, to yield said derived signals.

2. A computer for producing, from a set of varying input signals corresponding to the primary color intensities of an original object, a set of derived signals correctly representing optimum control amplitudes of polychrome image reproducing apparatus; comprising means for modifying each of the input signals in accordance with a predetermined function of the instantaneously maximum one of said signals, means for maintaining the signal-amplitude ratios of the modified signals at substantially the same values as those of the unmodified signals, and matrix means for intermixing a function of each of said modified signals with the same function of each of the others, to yield said derived signals.

3. In a computer of the type adapted to operate functionally upon signal series representative of the point-to-point luminosity of an object, a photomultiplier including a photosensitive cathode, an anode and a plurality of photomultiplier dynodes intervening therebetween, means for applying graded electron-accelerating potentials to a plurality of said dynodes lying in serial adjacent order following said cathode, means for deriving an output signal from said anode, and operational amplifiers controlled by said output signal for applying to at least two others of said dynodes signals providing varying electron-accelerating potentials to provide feedback control of the shape of the output signal from said anode.

4. In a computer of the type adapted to operate functionally upon a signal series representative of the point-to-point spectral luminosity of a polychrome original, a photomultiplier including a photosensitive cathode for receiving light energy from said original, an anode and a plurality of photomultiplier dynodes intervening therebetween; means for applying graded electron-accelerating potentials to a plurality of said dynodes lying in serial order following said cathode, means for deriving an output signal controlled by said light energy from said anode, and amplifying means controlled by said output signal for applying to another of said dynodes signals providing a varying electron-accelerating potential to provide feedback control of the shape of the output signal from said anode.

5. A computer for furnishing an approximate solution of the function $1-(1-M)(1-Y)(1-C)$, where M, Y and C are independent variables, comprising means for expressing the instantaneous values of M, Y and C as electrical signals, means for selecting from amongst said signals the instantaneous maximum signal, means for summing said signals, means for limiting the computed sum of said signals to a preset constant maximum value, and means for continuously deriving the desired approximation as the running average of the values of said maximum signal and the sum of said signals not exceeding said preset value.

6. A computer for producing an approximation of the function $S_K-S_G$, where $S_K=1-(1-M)(1-Y)(1-C)$, $S_G=1-(1-M)(1-C)$, and M, Y and C are independent variables, comprising means for expressing the values of M, Y and C as electrical signals varying with time, means for computing the absolute value of M reduced by the absolute value of the sum of M, Y and C in turn reduced by a constant level signal, and means for adding the value so computed to the value of the largest signal amongst M, Y and C, reduced by the largest signal as between Y and C.

7. A computer for producing an approximation of the function $S_K-S_G$, where $S_K=1-(1-M)(1-Y)(1-C)$, $S_G=1-(1-M)(1-C)$, and M, Y and C are independend variables, comprising means for expressing the values of M, Y and C as electrical signals varying with time, means for summing M, Y and C, means for subtracting from the sum a constant level signal, and means for deriving the absolute value of the difference as a first intermediate signal; means for subtracting said first intermediate signal from the M signal and means for deriving the absolute value of the difference as a second intermediate signal, means for adding said second intermediate signal to the instantaneously maximum signal as amongst the M, Y and C signals to produce a third intermediate signal, and means for subtracting, from said third intermediate signal, the instantaneously maximum signal as between the Y and C signals, to yield the desired approximation.

8. Computing apparatus for converting original electrical signals corresponding to the point-to-point color distribution of an object into derived signals suitable for the control of apparatus for making a reproduction of the color distribution of that object, comprising means defining plural input channels for the original signals, a maximum-signal selector connected to all of said input channels, a function former energized by the signal output of said selector, means controlled by said function former for operating upon each of the original signals to produce a corresponding set of modified color signals, a matrix comprising an electrical network connected to receive at its input terminals said modified signals and to modify each such modified signal by all of the others to produce linearly color-corrected signals at its output terminals, a plurality of overlap correction circuits individually connected between selected combinations of said output terminals and said network to further modify the color-corrected signals in accordance with non-linear corrections, and means for deriving from said output terminals fully color corrected signals for control of a reproduction apparatus.

9. Computing apparatus in accordance with claim 8, including a maximum signal selector connected to the outputs of the means controlled by said function former, and means for deriving a black signal from the output of the last-named maximum signal selector.

10. Computing apparatus for converting original electrical signals corresponding to the point-to-point color distribution of an object into derived signals suitable for the control of apparatus for making a reproduction of the color distribution of that object, comprising means defining plural input channels for the original signals, a maximum-signal selector connected to all of said input channels, a function former energized by the signal output of said selector, means controlled by said function former for operating upon each of the original signals to produce a corresponding set of modified color signals, a matrix comprising an electrical network connected to receive at its input terminals said modified signals and to modify each such modified signal by all of the others to produce linearly color-corrected signals at its output terminals, a plurality of feedback circuits individually connected between selected combinations of said output terminals and said network to further modify the color-corrected signals in accordance with non-linear corrections, a second set of output terminals, and means connected between said feedback circuits and said second set of output terminals for providing output signals compensated for the ink-trapping characteristics of a printing process in which said reproduction is to be employed.

11. Computing apparatus for converting original electrical signals corresponding to the point-to-point color distribution of an object into derived signals suitable for the control of apparatus for making a reproduction of the color distribution of that object, comprising means defining plural input channels for the original signals, a maximum-signal selector connected to all of said input channels, a function former energized by the signal output of said selector, manually adjustable controls for controlling the shape of the function generated by said function former, means controlled by said function former for operating upon each of the original signals to produce a corresponding set of color signals modified in accordance with the selected function shape, a matrix comprising an electrical network connected to receive at its input terminals said modified signals and to modify each such modified signal by all of the others to produce linearly color-corrected signals at its output terminals, a plurality of overlap correction circuits individually connected between selected combinations of said output terminals and said network to further modify the color-corrected signals in accordance with non-linear corrections, and means for deriving from said output terminals fully color corrected signals for control of a reproduction apparatus.

12. Computing apparatus for converting original electrical signals corresponding to the point-to-point color distribution of an object into derived signals suitable for the control of apparatus for making a reproduction of the color distribution of that object, comprising means defining plural input channels for the original signals, a maximum-signal selector connected to all of said input channels, a function former energized by the signal output of said selector, means controlled by said function former for operating upon each of the original signals to produce a corresponding set of modified color signals, a matrix comprising an electrical network connected to receive at its input terminals said modified signals and to modify each such modified signal by all the others to produce linearly color-corrected signals at its output terminals, a plurality of overlap correction circuits individually connected between selected combinations of said output terminals and said network to further modify the color-corrected signals in accordance with non-linear corrections, manual means for adjusting said overlap correction circuits, and means for deriving from said output terminals fully color corrected signals for control of a reproduction apparatus.

13. Computing apparatus in accordance with claim 12, in which the means defining said input channels comprises individual electron multiplier tubes having plural dynodes, and in which the means controlled by the respective function formers includes circuits for controlling the accelerating potentials applied to certain of the dynodes of said multipliers.

14. Computing apparatus in accordance with claim 12, in which the signals are of the form of monopolar electrical amplitude pulse series.

References Cited in the file of this patent

UNITED STATES PATENTS

| | | |
|---|---|---|
| Re. 23,914 | Boyajean | Dec. 21, 1954 |
| 2,413,706 | Gunderson | Jan. 7, 1947 |
| 2,434,561 | Hardy | Jan. 13, 1948 |
| 2,605,348 | Hall et al. | July 29, 1952 |
| 2,740,828 | Haynes | Apr. 3, 1956 |
| 2,790,844 | Naugebauer | Apr. 30, 1957 |
| 2,799,722 | Naugebauer | July 16, 1957 |